July 11, 1961    G. E. BOYD ET AL    2,992,249
ION EXCHANGE ADSORPTION PROCESS FOR PLUTONIUM SEPARATION
Filed Nov. 19, 1948
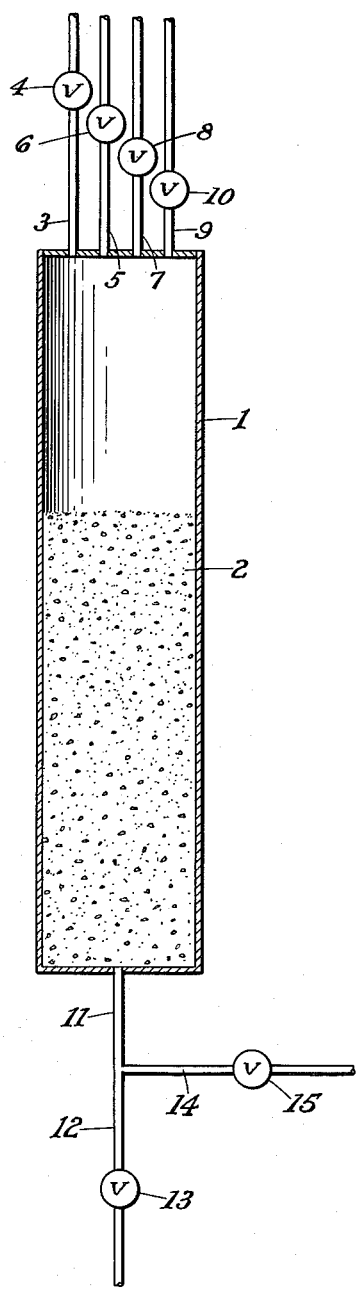
INVENTORS
George E. Boyd
Moddie D. Taylor &
BY Edwin R. Russell
Roland A. Anderson
ATTORNEY

United States Patent Office 2,992,249
Patented July 11, 1961

2,992,249
ION EXCHANGE ADSORPTION PROCESS FOR PLUTONIUM SEPARATION
George E. Boyd, Oak Ridge, Tenn., Edwin R. Russell, Columbia, S.C., and Moddie D. Taylor, Washington, D.C., assignors to the United States of America as represented by the United States Atomic Energy Commission
Filed Nov. 19, 1948, Ser. No. 60,942
18 Claims. (Cl. 260—429.1)

The present invention relates in general to a process for the separation of the transuranic element plutonium from solutions containing the same by means of adsorption and specific elution, and more particularly to a process for separating plutonium contained in a solution together with other material which involves adsorbing plutonium upon an adsorbent and selectively eluting plutonium from the adsorbent by means of certain types of carboxylic acids.

Reference herein to any of the elements is to be understood as denoting the element generically, whether in its free state or in the form of a compound, unless indicated otherwise by the context.

As is more or less generally known, plutonium, along with the other transuranic elements, is virtually nonexistent in nature. However, transuranic elements, particularly plutonium and neptunium, elements 94 and 93 respectively, may be produced by a nuclear transmutation of uranium, such processes not forming a part of the present invention. One extremely important application of the processes of the present invention, however, is in the isolation of plutonium produced by such transmutation processes.

The transmutation of uranium to plutonium may be effected by various processes, including irradiation of uranium with neutrons from any suitable source, but preferably, and by far most practically, by utilizing neutrons generated in a chain reaction of neutrons with uranium. Naturally occurring uranium contains a major portion of $_{92}U^{238}$, a minor portion of $_{92}U^{235}$ and small amounts of other substances such as $UX_1$ and $UX_2$. When a mass of such uranium is subjected to neutron irradiation, particularly with neutrons of resonance or thermal energies, $_{92}U^{238}$ by capture of a neutron becomes $_{92}U^{239}$ which has a half life of about twenty-three minutes and by beta decay becomes $93^{239}$. The $93^{239}$ has a half life of about 2.3 days and by beta decay becomes $94^{239}$. Thus, neutron irradiated uranium contains, upon irradiation, quantities of both $93^{239}$ and $94^{239}$, but upon storing irradiated uranium for a suitable length of time, almost all of the contained $93^{239}$ is converted to $94^{239}$.

In addition to the above-mentioned reaction, the reaction of neutrons with fissionable nuclei, such as the nucleus of $_{92}U^{235}$, results in the production of a large number of radioactive fission products in various relative amounts. For example, when an atom of $_{92}U^{235}$ undergoes fission, at least two fragments are formed. These fragments vary sufficiently in their masses and hence their atomic numbers to give some 34 elements, all of which initiate further reaction chains with accompanying emanation of radioactivity.

With the exception of elements of atomic numbers 43 and 61, the fission products formed by the above-discussed reaction are all well known elements with normal chemical properties, the only point of difference between them and the natural element being that they are composed of unstable isotopes. The fission of $_{92}U^{235}$ yields two general types of elements, namely heavy and light. The light fission products possess atomic numbers between 30 and 46 and include radioactive zinc, gallium, germanium, arsenic, selenium, bromine, krypton, rubidium, strontium, yttrium, zirconium, columbium, molybdenum, 43, ruthenium, rhodium, and palladium. The heavy fission products resulting from neutron irradiation of $_{92}U^{235}$ possess atomic numbers ranging from 47 to 63 and include radioactive silver, cadmium, indium, tin, antimony, tellurium, iodine, xenon, cesium, barium, lanthanum, cerium, praseodymium, neodymium, 61, semarium, and europium.

Generally speaking, the irradiation of naturally-occurring uranium is ordinarily conducted under such conditions as result in the combined amount of neptunium and plutonium being equal to approximately 0.02% by weight of the uranium mass. The concentration of the fission products in neutron-irradiated uranium is approximately the same as that of the total of the plutonium and neptunium. While plutonium is relatively quite stable, the fission products, on the other hand, change to other elements at fixed characteristic decay rates; thus the concentrations of initially-formed, radioactive fission products with respect to plutonium change substantially during the storage period which is generally employed after the termination of the neutron irradiation of the uranium. It is characteristic of such processes for the production of plutonium that individual fission products, subsequent to neutron irradiation of uranium, are present in very minute amounts; for example in a 10% uranyl nitrate solution of uranium which has been irradiated so as to transmute 0.02% of the uranium to neptunium and plutonium, the average individual fission product concentration is below $10^{-10}$ molar.

Even though the fission products are present in only minute amounts, they continue to exhibit radioactive properties even after a considerable period of storage; because of their radioactive emissions, deleterious both from physiological and technical standpoints, it is necessary, in order to successfully utilize plutonium, to separate the fission products from plutonium. In the past it was found that some members of both the light and heavy groups of fission products may be separated from the neutron irradiated uranium mass in that they have been found to have chemical properties similar to the rare earths and can, therefore, be isolated by precipitation under carefully controlled conditions with about 100 times their weight of carriers such as lanthanum fluoride, bismuth phosphate, and the like. However, a number of the fission products in both groups do not respond well to such treatment and considerable difficulty has been experienced in attempting to separate plutonium from these fission products.

It can be seen from the preceding discussion that the seperation and isolation of plutonium from a neutron irradiated uranium mass is an exceedingly difficult task, particularly in view of the fact that extremely small quantities of the individual fission products are present in the materials under treatment. The problem is further complicated by the presence of the various isotopes and the fact that the elements, considered to be formed at the time of fission, may actually represent conversion products from certain of the fission products which have undergone extremely rapid change, that is, those fission products having extremely short half lives. In this connection, approximately 155 isotopes of the fission products involved have been identified and about 30% of these have half lives of over eight hours. Fission products have been identified that have half lives ranging from three seconds to 10⁴ years. In addition, these difficulties are augmented in that components in neutron irradiated uranium, as was hereinbefore said, emit radioactive emanations which have detrimental effects on both personnel and equipment. For this reason, it is necessary, in the conducting of procedures involving the handling and processing of neutron irradiated uranium, to provide suitable protective measures against the radioactive emanations, such as, for example, the enveloping of processing apparatus with radiation shielding, and the provision of means for the control of the processes of operating personnel and instruments stationed at locations remote from the immediate vicinity of the processing.

One object of the present invention is to provide a process for the separation of plutonium from a solution containing the same by adsorption and selective elution.

Another object is to provide such a process which is relatively simple, efficient, and capable of remote control.

A further object is to provide such a simple, efficient, and remotely controllable process which may be utilized in conjunction with other methods of separating plutonium from solutions thereof.

Still another object is to provide such a process which will be particularly effective in the separation of plutonium from a solution of neutron irradiated uranium.

Other objects will become apparent hereinafter.

The accompanying drawing diagrammatically illustrates a system which may be utilized in the practice of our invention. Referring to the drawing, 1 designates a column containing a suitable adsorbent 2. To the upper portion of column 1 are connected line 3 controlled by valve 4, line 5 controlled by valve 6, line 7 controlled by valve 8 and line 9 controlled by valve 10. In view of the high radioactivity of the solution under treatment, valves 4, 6, 8 and 10 are operated by remote control. From the lower portion of column 1 leads line 11 which feeds into line 12 controlled by valve 13 and line 14 controlled by valve 15. Valves 13 and 15 are also operated by remote control.

In operation of the system described above, a solution containing plutonium together with fission products is passed through line 3 into column 1 wherein the plutonium, contaminants, for example fission products, and certain other dissolved material which may be present, such as uranium in the case of a uranyl nitrate solution, are adsorbed by adsorbent 2. Valve 4 is then closed, valve 6 opened, and an eluting agent selective for the said other material such as uranium is admitted through line 5. The said other material is eluted from adsorbent 2 and passes through line 11 and line 12 to disposal or further treatment, valve 15 in line 14 being closed. With valves 4, 6 and 10 closed, valve 8 is opened in line 7 and an eluting agent selective for certain contaminants such as zirconium and columbium fission products is admitted through line 7 into column 1 to elute from adsorbent 2 adsorbed contaminants. The eluate containing the eluted contaminants is withdrawn through lines 11 and 12 to disposal or other treatment. Following the above elutions, a certain type of carboxylic acid, as will be set forth hereinafter, adjusted to a concentration which is selective for plutonium is admitted through line 9, by opening valve 10, passes into column 1, and selectively elutes plutonium from adsorbent 2. The eluate containing plutonium passes through line 11 and through line 14 to storage or to further processing.

The solutions of plutonium which may be processed in accordance with the present invention are subject to wide variation. However, the invention is particularly adaptable to the separation of plutonium contained in a solution of neutron irradiated uranium. The solution for processing may be an aqueous solution of uranyl nitrate which is obtained by dissolving neutron irradiated uranium metal in aqueous nitric acid and which contains tetravalent plutonium in the presence of fission products and in the presence of hexavalent uranium. When such a solution is treated, it is generally the practice to selectively remove the uranyl ion from the adsorbent by means of dilute sulfuric acid or other sources of sulfate ion following adsorption and prior to other specific elution; for this purpose, aqueous sulfuric acid of a concentration of 2.5% by weight has afforded excellent results.

Another solution which may be treated in accordance with this invention is the aqueous raffinate obtained from the ether extraction of an aqueous uranyl nitrate solution. In the ether extraction process, $UO_2^{++}$ is extracted from the uranyl nitrate solution by means of ether and the residue is then contacted with water to obtain an aqueous solution containing fission products and plutonium; such solution being adaptable to processing for the recovery of plutonium in accordance with this invention. When such a solution is processed, elution steps specific for the removal of uranium may be eliminated.

In accordance with the present invention, plutonium may be separated and recovered from a solution the same by a process which comprises contacting the said solution with an adsorbent under conditions favoring the adsorption of plutonium, and then with the adsorbent disposed in the configuration of a bed, passing through the adsorbent bed dilute aqueous solution having a concentration greater than 2% by weight of a carboxylic acid having present in its molecule a second radical chosen from the group of radicals consisting of carboxyl, hydroxyl, amino, and carbonyl radicals to elute at least a portion of the plutonium. It is in further accordance with this invention to separate and recover plutonium from a solution containing the same as well as contaminants by a process which comprises contacting said solution with an adsorbent under conditions favoring the adsorption of plutonium along with at least a portion of said contaminants, then with the adsorbent disposed in the configuration of a bed, preferentially eluting at least a portion of adsorbed contaminants, particularly by means of passing through the said adsorbent bed an aqueous solution having a concentration within the range 0.05% to 1% by weight of a carboxylic acid having present in its molecule a second radical chosen from the group of radicals consisting of carboxyl, hydroxyl, amino, and carbonyl radicals, to elute at least a portion of adsorbed contaminants, and thereafter passing through the adsorbent bed an aqueous solution having a concentration of greater than 2% by weight of a carboxylic acid having present in its molecule a second radical chosen from the group of radicals consisting of carboxyl, hydroxyl, amino, and carbonyl radicals to elute at least a portion of the plutonium.

It was found that dilute aqueous solutions of these particular carboxylic acids possess the unexpected ability of selectively eluting particular cationic species adsorbed on an ion-exchange adsorbent, while at the same time not eluting others. It was furthermore found that this ability with respect to certain cationic species varies with the concentration of the elutriant solution; some species are eluted at one concentration of these particular carboxylic acids and not at another. It is believed that this ability may be attributed primarily to the action of the particular carboxylic acids in the preferential formation of complexes with the constituents which they elute, these complexes being soluble in the concentrations in which they exist in the eluting solution. When a dilute solution of such carboxylic acids in concentrations above about 0.05% are passed through a bed of an ion-exchange adsorbent which had previously been contacted with a fission-product-contaminated plutonium solution under conditions favoring adsorption, it elutes the particular fission products, zirconium and columbium. When it is employed in concentrations above about 2%, it specifically elutes plutonium as well. Therefore, when the particular carboxylic acids are employed in accordance with the hereinbefore outlined procedure, elution at a concentration between 0.05% to 1% selectively removes substantially all of the adsorbed zirconium and columbium, which comprises roughly one-half of the total gamma activity in an ordinary solution of neutron irradiated uranium, but substantially none of the plutonium, and little of the other fission products. Elution thereafter at a concentration of say 5% selectively removes substantially all of the plutonium, with very little fission product contamination. By virtue of the properties of selective elution of the said carboxylic acids, the process of this invention is an effective means for selectively separating plutonium from a fission-product-contaminated solution, such as a solution of neutron irradiated uranium.

In general, it is greatly preferred and highly advantageous that the plutonium be present as the $Pu^{+4}$ cation both while as an adsorbate and during its elution. While it is usually preferred to maintain the plutonium in the tetravalent state throughout the entire processing, from the initial adsorption step through the several elutions, it is oft times profitable to adsorb the plutonium in any of its other stable cationic states, e.g., $PuO_2^{+2}$ and $Pu^{+3}$, subsequently altering its valence state by employing as the first elutriant an agent selected from the certain carboxylic acids hereinbefore specified which has the proper oxidation-reduction potential to satisfactorily convert the adsorbed plutonium to the $Pu^{+4}$ cationic state. For example, if the plutonium is adsorbed as the $PuO_2^{+2}$ cation, it may be converted to $Pu^{+4}$ in situ by employing oxalic acid as the first elutriant. The preferability of both adsorbing and eluting the plutonium as the $Pu^{+4}$ cation is particularly marked if it is desired to adsorb both uranium and plutonium, followed by selective elution of the uranium prior to elution of plutonium. In such case, the uranium and plutonium should be adsorbed in different valence states, preferably as $UO_2^{+2}$ and $Pu^{+4}$. The usual uranyl nitrate solutions, derived from neutron irradiated uranium, contain these elements in their preferred valence states for simultaneous adsorption and selective elution.

The adsorption of the plutonium-containing solution in accordance with the present invention may be satisfactorily carried out with a wide variety of adsorbents, including both inorganic adsorbents, such as silica gel, diatomaceous earth, and the like, and organic adsorbents, such as activated carbon, sulfonated carbonaceous material (zeo-carb), phenol-formaldehyde resins preferably containing free sulfonic acid groups, and the like. Particularly advantageous results are obtained in this process by the use of ion-exchange adsorbents, more specifically cation-exchange adsorbents, in which the cation of the adsorbent is exchanged for a similarly charged ion of the substance being adsorbed. It has been found that the process is particularly effective where the adsorbent used is a relatively inert organic material containing free sulfonic acid groups. Thus, the adsorbent may comprise phenol-formaldehyde resins, lignite, phenol-tannic acid resins, or the like, which contain numerous R—$SO_3$—R' groups in which R is an organic group such as the methylene group and in which R' is hydrogen or a metal ion, although R' is preferably $H^+$ or $Na^+$. A particularly satisfactory adsorbent which may be employed is a phenol-formaldehyde condensation product containing methylene sulfonic acid groups (—$CH_2SO_3H$). In the adsorption process, the hydrogen of the sulfonic acid group is replaced by a cation of the substance to be adsorbed which thereupon forms a more or less loosely associated molecule with the residue.

An example of a method by which a sulfonated resin may be prepared, 175 parts of 1-hydroxy-benzene-4-sulfonic acid are heated together with 40 parts of a formaldehyde solution of 30% strength for one-half hour to about 105° C. Then, further 60 parts of formaldehyde are added and the temperature is kept for about 10 hours at 90° C. A hard black resin is formed which is stable to water and of conchoidal fracture. This resin is washed with water and finely comminuted. After use in adsorption, this base-exchanging body may be caused to regain its original adsorption capacity by regeneration with an acid or a solution of common salt.

Many types of carboxylic acids, also having present in the molecules thereof one or more, hydroxyl, amino, carbonyl or additional carboxyl radicals, or combinations thereof, when in aqueous solutions of the specified concentrations may be quite satisfactorily employed as eluting agents in accordance with the present invention. They may be either aliphatic or aromatic, saturated or unsaturated, and may contain radicals in addition to those previously specified. More specifically, saturated dicarboxylic acids, for instance, have been found to be very satisfactory as elutriants; a few examples being oxalic, malonic, succinic, glutaric, adipic, pimelic, suberic, azelaic, and sebacic acids. To examples of satisfactory unsaturated dicarboxylic acids are fumaric and maleic acids. Aromatic dicarboxylic acids which give satisfactory results include ortho, meta, and para phthallic acids. Satisfactory hydroxy-carboxylic acids include lactic, tartaric, malic, citric, salicylic, and tannic acids; amino-carboxylic acids include alanine, glycine, and aminobenzoic acids; keto-carboxylic acids include pyruvic acids; and aldehyde-carboxylic acids include glyoxylic acid.

It is unnecessary, although it has been found to be advantageous from the standpoints of simplicity and uniformity, to employ the same specific elutriant for the preferential elution of plutonium by concentrated carboxylic acid solutions as is used for the prior preferential elution of contaminants by dilute carboxylic acid solutions. However, if different elutriants are employed in successive elutions it is generally desirable to remove residual first elutriant from the adsorbent by a suitable procedure such as a brief water wash prior to the subsequent elution.

It has been found that particularly favorable results are obtained in the separation of plutonium from fission product contamination by employing specifically aqueous oxalic acid solutions as the elutriants both for the fission products, and for the preferential elution of plutonium.

While, in the practice of the present invention, advantageous results have been realized generally in the elution of contaminants by employing concentrations in the range of 0.05% to 1% by weight of the said certain types of carboxylic acids in aqueous solution, it has been found especially preferable with many varieties of adsorbed contaminants, particularly the fission products adsorbed from a solution of neutron irradiated uranium, that the concentration of the carboxylic acid in the contaminant elutriant be approximately 0.75% by weight.

The preferential elution of plutonium is accomplished, in accordance with this invention, by utilizing in the elutriant higher concentrations of the said type of carboxylic acid, namely concentrations in aqueous solution of over 2% by weight. While plutonium will be satisfactorily eluted by any aqueous solution of said carboxylic acid in excess of 2%, if there are present on the adsorbent any contaminants which were not eluted in the elution effected for that purpose, then concentrations of carboxylic acid very much in excess of 2% will serve to elute these contaminants along with the plutonium. Therefore, where it is desirable to effect a preferential elution of plutonium leaving much of the uneluted contamination on the adsorbent, it has been found expedient to limit the concentration range of the said aqueous carboxylic acid solution for plutonium elution to 2% to 8% by weight, the preferred concentration being approximately 5% by weight.

Where there are contaminants still present as adsorbate after the preferential elution of plutonium, they may be removed by any suitable method, such as by eluting with strong acid or sodium salt solutions, but preferably with an aqueous solution of sodium bisulfate of a concentration greater than 10%.

In conducting the processes of the present invention the scale of operations may be of a size ranging from that employing very small laboratory scale adsorption columns several centimeters in diameter to large industrial scale utilizing columns several feet in diameter. For example, satisfactory results may be obtained with a stainless steel column 2.5 feet in diameter and containing a 5 foot high adsorbent bed having a volume of 24.5 cubic feet. In such a column, the adsorbent is advantageously 20–100 U.S. mesh size, and preferably 50–70 mesh.

In the practice of this invention, it has been found particularly advantageous to carefully control certain variables such as rate of flow of various materials through the column. Generally speaking, the flow rate of initial feed solution while effecting the adsorption is advantageously maintained at 20 to 120 gallons per square foot per hour and preferably at 90 to 100 gals./sq. ft./hr. When dilute sulfuric acid is utilized as elutriant for uranium, the flow rate thereof through the adsorbent is advantageously maintained at 20 to 120 gals./sq. ft./hr. and preferably at 90 to 100 gals./sq. ft./hr. The flow rate of the said types of carboxylic acid through the adsorbent is advantageously maintained at a low value, such as between 20 and 40 gals./sq. ft./hr.; particularly advantageous results may be obtained at flow rates of 25 to 35 gals./sq. ft./hr. When a second contaminant elutriant such as sodium bisulfate solution as hereintofore described is utilized, the rate of flow is not of much importance, however some advantage may be realized by maintaining the flow rates at 40 to 80 gals./sq. ft./hr. with about 60 gals./sq. ft./hr. being best.

While the present invention has so far been described with reference to the system and mode of operation found to be the most practical, that is a system wherein the adsorbent is maintained at all times in a column in a bed formation through which the process solutions are passed downwardly, it is not essential that such procedure be used. For example, the adsorbent may be contacted with the solution from which plutonium is to be separated by forming a slurry of the two. It is however essential that during the elution steps the adsorbent be rather densely packed; the best elution results obtain from utilizing unidirectional flow of elutriant through the bed throughout each elution. Furthermore, when the adsorbent bed is disposed in a vertical column, the direction of flow of solutions therethrough need not necessarily be in a downward direction, but rather either upward or downward flow may be employed; the direction should be unidirectional, however, throughout a particular elution. A desirable procedure for column operation comprises down-flow for the initial solution during adsorption, down-flow for uranium elution, down-flow for the first contaminant elution, up-flow for the preferential elution of plutonium, and again down-flow for the elution of the remaining adsorbate.

The present invention, when applied to a typical uranyl nitrate solution of neutron irradiated uranium containing hexavalent uranium, tetravalent plutonium, and such fission products as zirconium, columbium, lanthanum, cerium, barium, and strontium, serves as an excellent method of separating uranium, plutonium and fission products from each other. For instance, following adsorption, dilute $H_2SO_4$ elutes the adsorbed uranium, one of the specified carboxylic acids elutes fission products including primarily zirconium and columbium, the same or another of the specified carboxylic acids at higher concentration elutes plutonium, and $NaHSO_4$ may be used to elute the bulk of the remaining fission products including primarily lanthanum, barium, cerium, and strontium.

The present invention may be further illustrated by the following specific examples.

EXAMPLE I

A neutron irradiated uranium mass which had been allowed to age for 100 days was analyzed to determine the percentages of the total beta activity and gamma activity attributable to each of the more active fission product elements present; the results are tabulated below.

*Distribution of beta activity in neutron irradiated uranium for each fission element as percentage of total*

| Element: | | Element: | |
|---|---|---|---|
| Ce | 27 | Pr | 0.72 |
| Sr | 26 | Cs | 0.72 |
| Y | 23 | La | 0.72 |
| Zr | 12 | Te | 0.67 |
| Ru | 3.5 | Ba | 0.52 |
| Cb | 3.4 | | |

*Distribution of effective gamma activity in neutron irradiated uranium for each fission element as percentage of total*

| Element: | | Element: | |
|---|---|---|---|
| Cb | 40 | La | 2.3 |
| Zr | 26 | Y | 2.3 |
| Ce | 10 | Te | 0.79 |
| Ru | 8.6 | Cs | 0.55 |
| Sr | 4.8 | Ba | 0.24 |

Certain fission products, as may be seen, were found to be both beta emitters and gamma emitters.

An adsorbent bed comprising 50 to 70 mesh, air-dried, ion-exchange resin characterized by having a plurality of $-CH_2SO_3H$ groups was provided. The bed was 5 feet in height. Through this adsorbent bed was passed a 10% by weight aqueous solution of uranyl nitrate prepared from the neturon-irradiated uranium analyzed, and containing in addition other fission products and plutonium, at a rate of 100 gals./sq. ft./hr. until 326 gals./sq. ft. had been passed through the bed. Uranium, plutonium, and fission products were adsorbed. The effluent solution from the adsorption step contained no detectable plutonium, 86% of the original uranium, and fission products to the extent of 10.1% of the original beta activity and 9.1% of the original gamma activity.

The adsorbent bed was then eluted with a 2.5% sulfuric acid solution flowed at the rate of 100 gals./sq. ft./hr. until 180 gals./sq. ft. had been passed through the bed. The resulting eluate was analyzed and found to contain about 14% of the original uranium, 4.7% of the original beta activity and 6% of the original gamma activity.

The adsorbent bed was then treated with a 0.75% oxalic acid wash supplied at the rate of 30 gals./sq. ft./hr. until 240 gals./sq. ft. had been run through. The eluate was analyzed and found to contain about 1.9% of the original plutonium, 13.2% of the original beta activity and 42.3% of the original gamma activity.

Thereafter a 5% oxalic acid solution was supplied at a rate of 30 gals./sq. ft./hr. until 92.5 gals./sq. ft. had been passed through the adsorbent bed. The eluate was analyzed and found to contain 95.4% of the original plutonium, 1% of the original beta activity and 1.5% of the original gamma activity. Thereafter the adsorbent was treated with 18% sodium bisulfate wash supplied at 60 gals./sq. ft./hr. until 107 gals./sq. ft. had been passed through. The resulting eluate was analyzed and found to contain 2.7% of the original plutonium, 68% of the original beta activity, and 41.6% of the original gamma activity. Thereafter, the adsorbent was backwashed with distilled water and rinsed with distilled water, after which it was in suitable condition for use in another adsorption cycle.

Examples II to V describe separations which are made by procedure similar to that shown in Example I, but with different specific elutriants and process variables. To facilitate the description of these separations, they are presented hereinafter in outline form, the basic procedure being the same as that of the run in Example I. In each example the plutonium containing solution is substantially exactly the same as that of Example I.

EXAMPLE II

Adsorbent: Same as in Example I
Bed dimensions: Same as in Example I
Adsorption:
    Flow rate: 90 gals./sq. ft./hr. (average)
    Quantity of feed solution: 305 gals./sq. ft.
    Content of effluent solution:
        Uranium: 83% of the original uranium
        Fission products:
            10.5% of the original beta activity
            9.2% of the original gamma activity
Uranium elution:
    Elutriant: 2.5% (by weight) $H_2SO_4$ (aqueous)
    Flow rate: 100 gals./sq. ft./hr.
    Quantity of elutriant: 200 gals./sq. ft. (approximately)
    Content of eluate:
        Uranium: 17% of the original uranium
        Fission products:
            4.5% of the original beta activity
            5.9% of the original gamma activity
Contaminant elution:
    Elutriant: 1% aqueous tartaric acid solution
    Flow rate: 30 gals./sq. ft./hr.
    Quantity used: 250 gals./sq. ft.
    Content of eluate:
        Plutonium: 2.9% of original plutonium
        Fission products:
            9.2% of original beta activity
            41% of original gamma activity
Plutonium elution:
    Elutriant: 5% aqueous tartaric acid
    Flow rate: 30 gals./sq. ft./hr.
    Quantity used: 95 gals./sq. ft.
    Contents of eluate:
        Plutonium: ca. 92% of original
        Fission products:
            1.2% of original beta activity
            1.6% of original gamma activity
Bisulfate wash:
    Elutriant: 18% aqueous $NaHSO_4$
    Flow rate: 60 gals./sq. ft./hr.
    Quantity used: 100 gals./sq. ft.
    Contents of eluate:
        Plutonium: 5.1% of original
        Fission products:
            73% of original beta activity
            40% of original gamma activity

EXAMPLE III

Adsorbent: Same as in Example I
Bed dimensions: Same as in Example I
Adsorption:
    Flow rate: 97 gals./sq. ft./hr.
    Quantity of feed solution: 320 gals./sq. ft.
    Content of effluent solution:
        Uranium: 85% of the original uranium
        Fission products:
            10% of original beta activity
            9% of original gamma activity
Uranium elution:
    Elutriant: 2.5% (by weight) $H_2SO_4$ (aqueous)
    Flow rate: 115 gals./sq. ft./hr.
    Quantity of elutriant: 225 gals./sq. ft.
    Contents of eluate:
        Uranium: 15% of original uranium
        Fission products:
            4.5% of original beta activity
            6.3% of original gamma activity
Contaminant elution:
    Elutriant: 0.95% citric acid (aqueous)
    Flow rate: 30 gals./sq. ft./hr.
    Quantity used: 250 gals./sq. ft.
    Content of eluate:
        Plutonium: 3.4% of the original plutonium
        Fission products:
            12.6% of the original beta activity
            45% of the original gamma activity
Plutonium elution:
    Elutriant: 5% citric acid (aqueous)
    Flow rate: 30 gals./sq. ft./hr.
    Quantity used: 90 gals./sq. ft.
    Contents of eluate:
        Plutonium: ca. 90% of original
        Fission products:
            0.9% of the original beta activity
            1.6% of the original gamma activity
Bisulfate wash:
    Elutriant: 18% aqueous $NaHSO_4$
    Flow rate: 60 gals./sq. ft./hr.
    Quantity used: 98 gals./sq. ft.
    Contents of eluate:
        Plutonium: 6.6% of original
        Fission products:
            70% of original beta activity
            36.2% of original gamma activity

EXAMPLE IV

The procedure followed in Example I as followed through the adsorption and uranium elution steps, following which the contaminant and plutonium elutions are effected as follows:

Contaminant elution:
    Elutriant: 1% lactic acid (aqueous)
    Flow rate: 30 gals./sq. ft./hr.
    Quantity used: 250 gals./sq. ft.
    Contents of eluate:
        Plutonium: 3.6% of original
        Fission products:
            12.6% or original beta activity
            45% of original gamma activity
Plutonium elution:
    Elutriant: 5% aqueous lactic acid
    Flow rate: 30 gals./sq. ft./hr.
    Quantity used: 90 gals./sq. ft.
    Contents of eluate:
        Plutonium: 88% of original
        Fission products:
            .1% or original beta activity
            1.5% of original gamma activity The bisulfate wash is effected as in Example I.

EXAMPLE V

Proceeding as in Example IV, with the flow rates and quantities of elutriants being the same as in that also, elution with an amino acid is conducted as follows:

Elutriant: 0.9% aqueous para amino benzoic acid
Content of eluate:
    Plutonium: 3.5% or original
    Fission products:
        12% of original beta activity
        40% of original gamma activity
Plutonium elution:
    Elutriant: 5% aqueous para amino benzoic acid
    Content of eluate:
        Plutonium: ca. 85% of original
        Fission products:
            ca. 1% of original beta activity
            ca. 1.5% of original gamma activity Example VI describes the application of the present process to the separation and recovery of zirconium and columbium, and of lanthanum, barium, strontium, and cerium in two separate fractions from a dissolved fission mixture.

EXAMPLE VI 625 ml. of a 10% aqueous uranyl nitrate solution contaminated with fission products was found by analysis to contain the activity tabulated below:

| Gamma Activity (counts/min.×10³) | | | | Beta Activity (counts/min.×10⁶) | | | | | |
|---|---|---|---|---|---|---|---|---|---|
| La | Zr | Cb | Ru | Ba | Sr | Ce | I | Te | Cs |
| 957 | 700 | 582 | 162 | 39.4 | 96.2 | 83.9 | 2.28 | 5.00 | 0.822 |

All of the solution was passed through an adsorbent bed comprising 50 to 70 mesh, air dried, ion-exchange resin characterized by having a plurality of —CH₂SO₃H groups. The bed was 0.8 cm. in diameter by 61 cm. high. Then, in succession, 0.5 N H₂SO₄, 0.5% H₂C₂O₄·2H₂O and 18% NaHSO₄ were passed through the adsorbent bed and the effluent solutions were separately collected. The individual volumes, flow rates, and distribution of the fission product activities in each effluent fraction in terms of percentage of starting activity are tabulated in the following table:

| Solution | Volume, ml. | Flow Rate, gals./ft.²/hr. | Gamma Activity | | | | Beta Activity | | | | | |
|---|---|---|---|---|---|---|---|---|---|---|---|---|
| | | | La | Zr | Cb | Ru | Ba | Sr | Ce | I | Te | Cs |
| Initial UNH | 625 | 100 | 100 | 100 | 100 | 100 | 100 | 100 | 100 | 100 | 100 | 100 |
| Effluent UNH | 625 | 100 | 32.8 | 11.3 | 2.3 | 90.0 | 53.5 | 83.2 | 18.8 | 2.9 | 26.1 | 39.8 |
| 0.5% H₂SO₄ | 125 | 100 | 5.5 | 2.4 | 0.5 | 5.3 | 9.3 | 1.2 | 3.7 | 0.4 | | |
| 0.5% Oxalic Acid | 425 | 30 | 0.3 | 70.4 | 108.4 | 1.3 | 0.2 | 0.2 | 0.1 | | | |
| 18% NaHSO₄ | 100 | 60 | 72 | 0.0 | 0.0 | 0.2 | 41.8 | 16.0 | 64.0 | | | |

The marked separation of zirconium and columbium from other fission products, particularly lanthanum, barium, strontium, and cerium, is clearly illustrated in the results of the run described in Example VI.

While the processes of the present invention are ideally suited for the separation and recovery of plutonium from a solution of neutron irradiated uranium, and while the description herein has been particularly directed to that application, still this invention is by no means limited thereto. This invention also provides an efficient and effective means for selectively separating and recovering zirconium and columbium from a general fission product mixture. Such separation may be effected in accordance with the present invention, by a process very similar to processes hereinbefore described, comprising contacting a dilute aqueous solution of the fission product mixture with an ion-exchange adsorbent under conditions favoring the adsorption of fission products, and then with the adsorbent disposed in the configuration of a bed, passing through the adsorbent bed a 0.05% to 1% aqueous solution of a carboxylic acid having present in its molecule a second radical chosen from the group of radicals consisting of carboxyl, hydroxyl, amino, and carbonyl radicals to selectively elute at least a portion of the zirconium and columbium. The remaining fission products may thereafter be removed by eluting with NaHSO₄, as hereinbefore described, or may be subjected to the action of other selective elutriants. Such procedure has been found particularly effective in separating fission product zirconium and columbium from fission product, lanthanum, barium, strontium, and cerium, which ordinarily comprise a considerable portion of the entire fission product activity in a solution of neutron irradiated uranium. Such application of these processes is of great value in the art of producing pure radio-isotopes. This process is, of course, not restricted in its application to fission product zirconium and columbium, but may be practically applied in a like manner to ordinary zirconium or columbium of common occurrence. Broadly speaking, this process may be effectively applied generally to dilute aqueous solutions containing zirconium or columbium, or both, for the separation and recovery of these materials.

It is also to be understood that while the present processes have been described with particular reference to the recovery of plutonium from solutions of neutron irradiated uranium, they have general applicability to the separation or recovery of plutonium from any solution containing the same. This invention is adaptable, for example, to use in the recovery of plutonium from the fuel solution in neutronic nuclear reactors employing a circulating solution containing fissionable material. Other applications will become apparent from the teaching set forth in the present specification.

The term "eluate" or its equivalent is intended to include any effluent bearing a desired product from a bed of adsorbent.

The term "eluating agent," "elutriant," or their equivalent is intended to include a material which removes adsorbed material from a bed of adsorbent.

The term "adsorption" is utilized in referring to removal of components from solution by a solid material. It is to be understood, however, that this invention is not to be limited in any sense by the theory upon which the process is based, and that this term is used as it is generally employed in the art of chromatographic separation.

It is to be understood that all matters contained in the above description and examples are illustrative only and do not limit the scope of the present invention as it is intended to claim the invention as broadly as possible in view of the prior art.

What is claimed is:

1. A process of separating plutonium from a liquid containing the same which comprises contacting said liquid with an adsorbent under conditions favoring the adsorption of plutonium, then with the adsorbent disposed in the configuration of a bed passing therethrough an aqueous solution having a concentration greater than 2% by weight of a carboxylic acid having present in its molecule a second radical chosen from the group of radicals consisting of carboxyl, hydroxyl, amino, and carbonyl radicals to elute at least a portion of said plutonium.

2. A process for separating plutonium from a solution containing the same as well as contaminants which comprises contacting said solution with an adsorbent under conditions favoring the adsorption of plutonium along with at least a portion of said contaminants, then with the adsorbent disposed in the configuration of a bed, preferentially eluting at least a portion of adsorbed contaminants, and thereafter passing through the said adsorbent bed a dilute, aqueous solution having a concentration greater than 2% by weight of a carboxylic acid having present in its molecule a second radical chosen from the group of radicals consisting of carboxyl, hydroxyl, amino and carbonyl radicals to elute at least a portion of said plutonium.

3. A process for separating plutonium from a solution containing the same together with other material including fission products, which comprises contacting said solution with an ion-exchange adsorbent under conditions favoring the adsorption of plutonium along with at least a portion of said other material including fission products, then with the adsorbent disposed in the configuration of a bed, passing therethrough an aqueous solution having a concentration within the range 0.05% to 1% by weight of a carboxylic acid having present in its molecule a second radical chosen from the group of radicals consisting of the carboxyl, hydroxyl, amino and carbonyl radicals to elute at least a portion of said fission products, and thereafter passing through the said adsorbent bed a dilute, aqueous solution having a concentration greater than 2% by weight of a carboxylic acid having present in its molecule a second radical chosen from the group of radicals consisting of carboxyl, hydroxyl, amino and carbonyl radicals to elute at least a portion of said plutonium.

4. A process for separating and recovering plutonium from an aqueous solution containing the same in cationic form as well as fission products comprising contacting said solution with a cation exchange adsorbent under conditions favoring the adsorption of plutonium along with at least a portion of said fission products, then with the adsorbent disposed in the configuration of a bed passing therethrough an aqueous solution having a concentration within the range 0.05% to 1% by weight of a polycarboxylic acid to elute at least a portion of adsorbed fission products, and thereafter passing through the said adsorbent bed a dilute aqueous solution having a concentration greater than 2% by weight of a polycarboxylic acid to elute at least a portion of said plutonium.

5. A process for separating and recovering plutonium from a solution containing the same in cationic form as well as fission products comprising contacting said solution with cation exchange adsorbent under conditions favoring the adsorption of plutonium along with at least a portion of said fission products, then with the adsorbent disposed in the configuration of a bed, passing therethrough an aqueous solution having a concentration within the range 0.05% to 1% by weight of a hydroxy-carboxylic acid to elute at least a portion of adsorbed fission products, and thereafter passing through the said adsorbent bed an aqueous solution having a concentration greater than 2% by weight of a hydroxy-carboxylic acid to elute at least a portion of said plutonium.

6. A process for separating and recovering plutonium from a solution containing the same in cationic form as well as fission products comprising contacting said solution with cation exchange adsorbent under conditions favoring the adsorption of plutonium along with at least a portion of said fission products, then with the adsorbent disposed in the configuration of a bed, passing therethrough an aqueous solution having a concentration within the range 0.05% to 1% by weight of an amino-carboxylic acid to elute at least a portion of adsorbed fission products, and thereafter passing through the said adsorbent bed an aqueous solution having a concentration greater than 2% by weight of an amino-carboxylic acid to elute at least a portion of said plutonium.

7. A process for separating the components of an aqueous solution containing hexavalent uranium, tetravalent plutonium, and fission product zirconium and columbium which comprises contacting said solution with cation exchange adsorbent under conditions favoring the adsorption therefrom of uranium, plutonium, zirconium and columbium, then with the adsorbent disposed in the configuration of a bed, passing therethrough a dilute aqueous sulfuric acid solution to remove uranium therefrom, then passing therethrough an aqueous solution having a concentration within the range 0.05% to 1% by weight of a carboxylic acid having present in its molecule a second radical chosen from the group of radicals consisting of carboxyl, hydroxyl, amino and carbonyl radicals to elute at least a portion of said zirconium and columbium, and thereafter passing through the said adsorbent bed an aqueous solution having a concentration greater than 2% by weight of a carboxylic acid having present in the molecule a second radical chosen from the group of radicals consisting of carboxyl, hydroxyl, amino and carbonyl radicals to elute at least a portion of said plutonium.

8. A process for separating plutonium from a solution including tetravalent plutonium and hexavalent uranium which comprises contacting said solution with a cation exchange adsorbent resin, having in its molecule a multiplicity of methylene sulfonic acid groups, under conditions favoring the adsorption of plutonium along with at least a portion of the said uranium, then with the cation exchange adsorbent disposed in the configuration of a bed, passing therethrough a dilute aqueous solution of sulfuric acid to remove uranium therefrom, and thereafter passing through the said cation exchange adsorbent bed an aqueous solution having a concentration greater than 2% by weight of a carboxylic acid having present in the molecule a second radical chosen from the group of radicals consisting of carboxyl, hydroxyl, amino and carbonyl radicals to elute at least a portion of said plutonium.

9. A process for separating plutonium from an aqueous nitric acid solution containing the same as well as fission product zirconium and columbium, and other fission products, which comprises contacting said solution with a cation exchange adsorbent under conditions favoring the adsorption of plutonium along with fission products, then with the said adsorbent in the configuration of a bed, passing therethrough an aqueous solution having a concentration of 0.75% by weight of a carboxylic acid having present in its molecule a second radical chosen from the group of radicals consisting of the carboxyl, hydroxyl, amino, and carbonyl radicals to elute at least a portion of adsorbed zirconium, columbium and other fission products, and thereafter passing through the said adsorbent bed an aqueous solution having a concentration of 5% by weight of a carboxylic acid having present in the molecule a second radical chosen from the group of radicals consisting of carboxyl, hydroxyl, amino and carbonyl radicals to elute at least a portion of said plutonium.

10. A process of separating plutonium from a solution containing the same as well as fission product zirconium and columbium, and other fission products, which comprises contacting the said solution with an adsorbent under conditions favoring the adsorption of plutonium along with at least a portion of the said fission products, then with the adsorbent disposed in the configuration of a bed passing therethrough an aqueous solution having a concentration within the range of 0.05% to 1% by weight of a carboxylic acid having present in its molecule a second radical chosen from the group of radicals consisting of carboxyl, hydroxyl, amino and carbonyl radicals to elute at least a portion of the said zirconium and columbium, then passing through the said adsorbent bed an aqueous solution having a concentration within the range 2% to 8% by weight of a carboxylic acid having present in the molecule a second radical chosen from the group of radicals consisting of the carboxyl, hydroxyl, amino and carbonyl radicals to elute at least a portion of said plutonium, and thereafter passing through the said adsorbent bed an aqueous solution of sodium bisulfate having a concentration in excess of 10% by weight to remove the bulk of the fission products still in the adsorbate.

11. A process for separating and recovering plutonium from an aqueous solution containing the same as well as fission product zirconium and columbium comprising contacting said solution with a cation exchange adsorbent under conditions favoring the adsorption of plutonium, zirconium and columbium, then with the adsorbent disposed in the configuration of a bed passing therethrough an aqueous solution having a concentration within the range 0.05% to 1% by weight of oxalic acid to elute at least a portion of adsorbed zirconium and columbium, and thereafter passing through the said adsorbent bed a dilute aqueous solution having a concentration greater than 2% by weight of oxalic acid to elute at least a portion of said plutonium.

12. A process for separating and recovering plutonium from an aqueous solution containing the same as well as fission product zirconium and columbium comprising contacting said solution with a cation exchange adsorbent under conditions favoring the adsorption of plutonium, zirconium and columbium, then with the adsorbent disposed in the configuration of a bed passing therethrough an aqueous solution having a concentration within the range 0.05% to 1% by weight of tartaric acid to elute at least a portion of adsorbed zirconium and columbium, and thereafter passing through the said adsorbent bed a dilute aqueous solution having a concentration greater than 2% by weight of tartaric acid to elute at least a portion of said plutonium.

13. A process for separating and recovering plutonium from an aqueous solution containing the same as well as fission product zirconium and columbium comprising contacting said solution with a cation exchange adsorbent under conditions favoring the adsorption of plutonium, zirconium and columbium, then with the adsorbent disposed in the configuration of a bed passing therethrough an aqueous solution having a concentration within the range 0.05% to 1% by weight of para-aminobenzoic acid to elute at least a portion of adsorbed zirconium and columbium, and thereafter passing through the said adsorbent bed a dilute aqueous solution having a concentration greater than 2% by weight of para aminobenzoic acid to elute at least a portion of said plutonium.

14. A process of separating plutonium from a solution containing tetravalent plutonium, hexavalent uranium, zirconium, columbium, lanthanum, barium, cerium, and strontium, comprising contacting the said solution with an adsorbent under conditions favoring the adsorption of plutonium, uranium, zirconium, columbium, lanthanum, barium, cerium, and strontium, then with the adsorbent disposed in the configuration of a bed, passing therethrough a dilute sulfuric aqueous acid solution to elute uranium, then passing therethrough an aqueous solution having a concentration within the range 0.05% to 1% by weight of a carboxylic acid having present in its molecule a second radical chosen from the group of radicals consisting of the carboxyl, hydroxyl, amino, and carbonyl radicals to elute adsorbed zirconium and columbium, thereafter passing through the said adsorbent bed an aqueous solution having a concentration within the range of 2% to 8% by weight of a carboxylic acid having present in its molecule a second radical chosen from the group of radicals consisting of the carboxyl, hydroxyl, amino, and carbonyl radicals to elute adsorbed plutonium, and thereafter passing therethrough an aqueous solution having a concentration of over 10% by weight of sodium bisulfate to elute lanthanum, barium, cerium, and strontium.

15. A process of separating plutonium from an aqueous uranyl nitrate solution containing the same together with fission product zirconium and columbium comprising passing the said solution through a bed of cation exchange resin at a rate within the range of 20 to 120 gals./sq. ft./hr. under conditions favoring the adsorption of plutonium, uranium, and fission products, then passing through the said adsorbent bed a dilute aqueous sulfuric acid solution at a rate within the range of 20 to 120 gals./sq. ft./hr. to elute adsorbed uranium, then passing therethrough at a rate within the range of 20 to 40 gals./sq. ft./hr. of an aqueous solution having a concentration within the range of 0.05% to 1% by weight of a carboxylic acid having present in its molecule a second radical chosen from the group of radicals consisting of the carboxyl, hydroxyl, amino, and carbonyl radicals to elute at least a portion of adsorbed fission product zirconium and columbium, and thereafter passing therethrough at a rate within the range of 20 to 40 gals./sq. ft./hr. of an aqueous solution having a concentration within the range of 2% to 8% by weight of a carboxylic acid having present in its molecules a second radical chosen from the group of radicals consisting of the carboxyl, hydroxyl, amino, and carbonyl radicals to elute at least a portion of adsorbed plutonium.

16. A process for separating and recovering fission product zirconium and columbium from an aqueous solution of a fission product mixture containing the same which comprises contacting said solution with a cation exchange adsorbent under conditions favoring the adsorption of fission products, particularly zirconium and columbium, then with the adsorbent disposed in the configuration of a bed passing therethrough an aqueous solution having a concentration within the range 0.05% to 1% by weight of a carboxylic acid having present in its molecule a second radical chosen from the group of radicals consisting of carboxyl, hydroxyl, amino and carbonyl radicals to preferentially elute at least a portion of the adsorbed zirconium and columbium.

17. A process for separating and recovering two separate fractions from a dilute aqueous solution containing at least one dissolved substance of the group consisting of zirconium and columbium, and also at least one dissolved substance of the group consisting of lanthanum, barium, strontium, and cerium, with the first of said fractions comprising susbtances of the first said group present in said solution, and the second fraction comprising substances of the second said group present in said solution, which comprises contacting said solution with a cation exchange adsorbent under conditions favoring the adsorption of said substances, then with the adsorbent disposed in the configuration of a bed, passing therethrough an aqueous solution having a concentration within the range 0.05% to 1% by weight of a carboxylic acid having present in its molecule a second radical chosen from the group of radicals consisting of the carboxyl, hydroxyl, amino, and carbonyl radicals to preferentially elute at least a portion of the consequently-adsorbed substances of the first said group, and thereafter passing therethrough an aqueous solution having a concentration of over 10% by weight of sodium bisulfate to elute consequently-adsorbed substances of the second said group.

18. The process of claim 17 wherein said carboxylic acid having present in its molecule a second radical chosen from the group of radicals consisting of the carboxyl, hydroxyl, amino, and carbonyl radicals is specifically oxalic acid.

References Cited in the file of this patent

Tompkins et al.: Ion Exchange as a Separations Method, Journal of the American Chemical Society, vol. 69, pages 2769–2777 (1947).

CN–1839, U.S. Atomic Energy Commission document dated July 10, 1944, declassified Feb. 14, 1957 (15 pages).